United States Patent [19]
Knecht et al.

[11] Patent Number: 4,761,917
[45] Date of Patent: Aug. 9, 1988

[54] DEFLATABLE WEATHERSTRIPS

[75] Inventors: Allen F. Knecht, Centerville; John F. Eilerman; Stanley E. Smith, both of Dayton; Jack E. Smith, Huber Heights, all of Ohio

[73] Assignee: General Motors Corporation, Detroit, Mich.

[21] Appl. No.: 10,368

[22] Filed: Feb. 3, 1987

[51] Int. Cl.$^4$ .............................................. E06B 7/16
[52] U.S. Cl. ........................................ 49/477; 49/498
[58] Field of Search .......................... 49/477, 497, 498; 220/232; 277/34

[56] References Cited

U.S. PATENT DOCUMENTS

| | | | |
|---|---|---|---|
| 2,003,614 | 6/1935 | Shetzline | 49/477 |
| 2,104,144 | 1/1938 | Zand . | |
| 3,040,393 | 6/1962 | Dailey | 49/477 |
| 3,100,918 | 8/1963 | Coverley | 49/477 |
| 3,110,065 | 11/1963 | Dewis | 49/477 |
| 3,438,150 | 5/1969 | Heim | 49/477 |

FOREIGN PATENT DOCUMENTS 2481204 10/1981 France .

*Primary Examiner*—Peter A. Aschenbrenner
*Assistant Examiner*—Gerald A. Anderson
*Attorney, Agent, or Firm*—R. L. Phillips

[57] ABSTRACT

An apparatus and method for sealing between a movable vehicular closure and body, especially adapted for an automobile, is disclosed. A deflatable sealing member forms a weatherstrip to seal the opening in the vehicle body and includes an operable tubular portion and an integral mounting portion. The sealing member is designed for resilient interference engagement between the closure and the body when expanded by the built-in resilient memory. The closure is mounted so as to provide relative transverse movement between the sealing member and one of said closure and said body during closing. In order to deflate the sealing member, a vacuum source, which may be a bellows pump, separate electric pump, engine vacuum, or the like, is connected to the single port of the sealing member and is activated at least during the closing of the closure. After closing, the control valves switch from the vacuum source to a vent to ambient pressure thereby inflating the sealing member. With the sealing member deflated, the closing effort of the closure is substantially reduced and compression shock inside the vehicle is eliminated. Two alternative embodiments featuring the alternative vacuum sources and valving arrangements are included. Also, a relatively non-deflatable bumper portion of the sealing member is disclosed to absorb shock during closing.

1 Claim, 3 Drawing Sheets

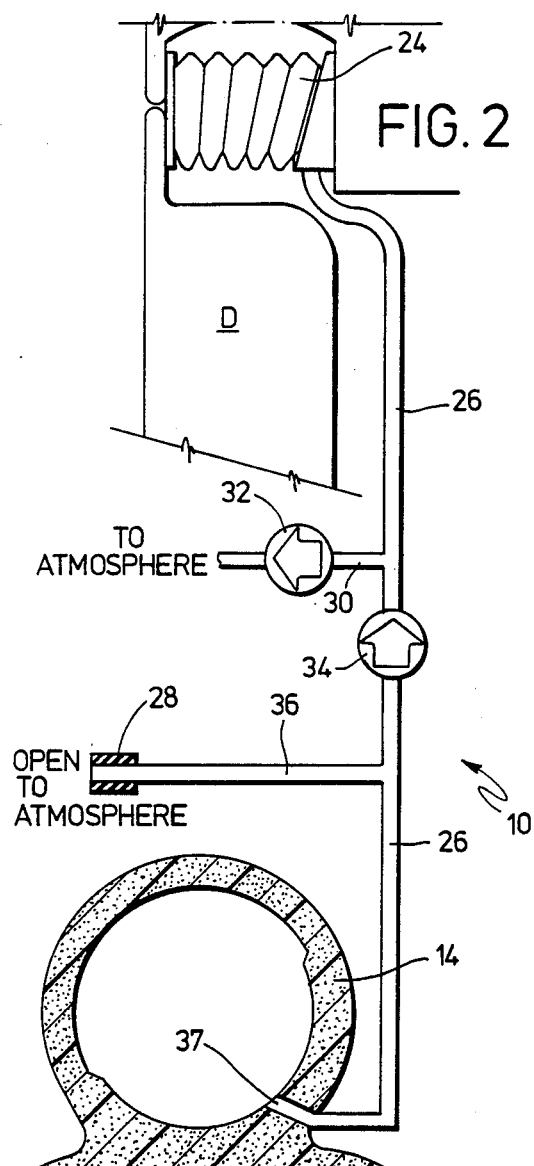
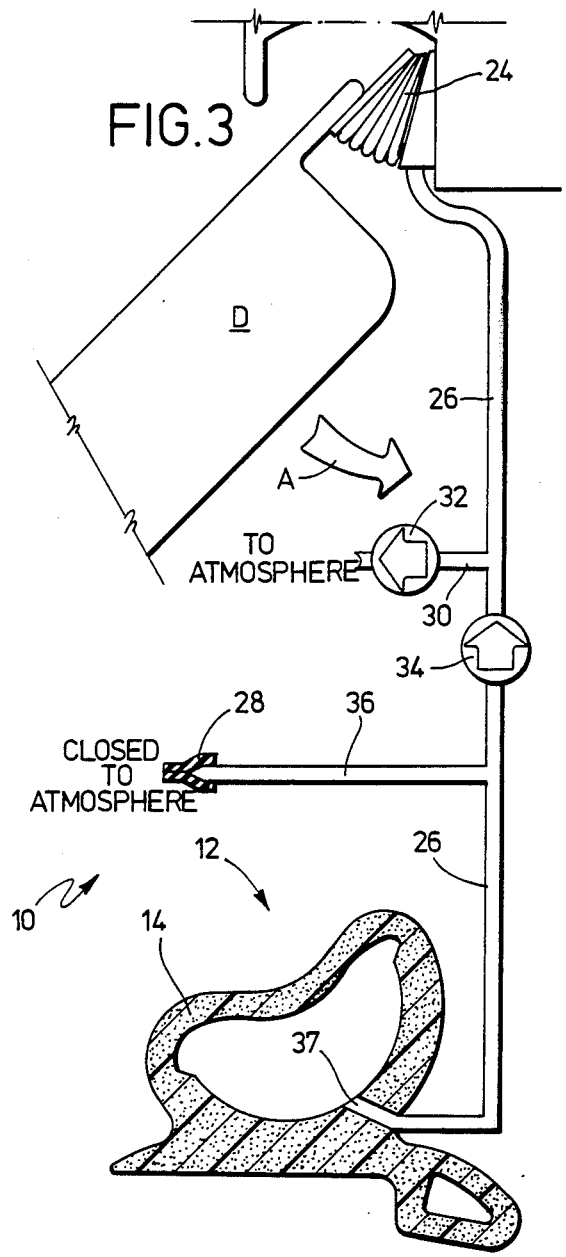
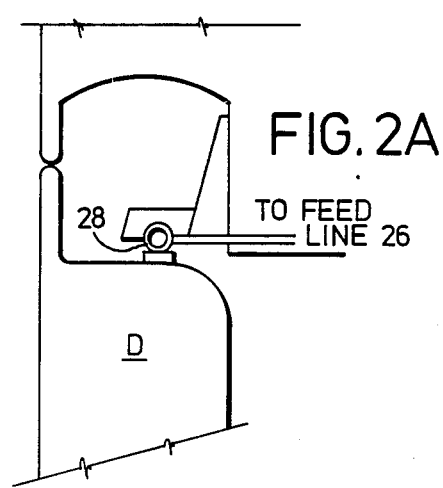
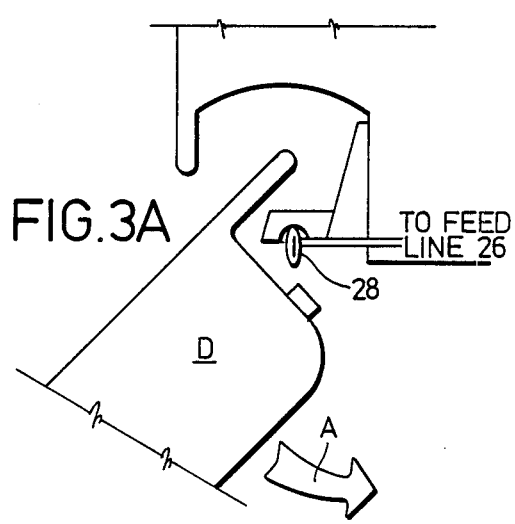

DEFLATABLE WEATHERSTRIPS

TECHNICAL FIELD

The present invention relates generally to the sealing of closures and, more particularly, to a sealing apparatus and related method of operation for a vehicle closure that requires relatively low closing effort but provides an exceptionally firm, tight seal.

BACKGROUND OF THE INVENTION

Closed cell sponge weatherstrips have been the standard for years to seal vehicle closures against the passage of air and moisture. The weatherstrip attaches to the vehicle body or closure around the opening (e.g. door or trunk opening). The weatherstrip preferably includes a bulbular or tubular section that is designed to provide an interference fit between the closure and body, and a mounting section to secure the weatherstrip in place. When the door or trunk lid is closed, the weatherstrip mechanically flexes according to the degree of interference. Generally, the greater the interference, the better the sealing function is obtained.

Good sealing of closures is particularly important in vehicles in order to isolate the passengers from inclement weather conditions; namely, precipitation as well as excessively hot or cold air. Since the vehicle moves through the air, it is also important to the comfort of the passengers to minimize the wind noise. It should be recognized, however, that the high degree of interference of the weatherstrip between the door and door frame required for good sealing, unfortunately increases the closing effort.

Another consideration for vehicle weatherstrip design relates to an annoying problem known as "compression shock". With the improved closure sealing, the rapid closing of a door on an otherwise closed vehicle often results in a momentary air compression in the passenger compartment. In essence, trapped air inside the compartment cannot escape past the tight weatherstrip seals around the various closures. This problem is particularly acute in designs where the closure moves substantially transverse to the body, such as in conventional swinging doors or trunk lids. This compression shock not only further increases the closing effort required, but also causes an unpleasant feeling to the passengers.

Attempts to reduce door closing effort have in the past resulted in reduced sealing efficiency. Conversely, past attempts to emphasize improved sealing have resulted in a need for excessive closing effort. Neither extreme is favored by consumers. Thus, automotive engineers have found it necessary to compromise these conflicting engineering requirements, with the best designs heretofore carefully balancing the relationship between sealing and closing effort.

Some efforts in the past have addressed the seemingly conflicting concerns and provided some limited improvement. For example, spaced bleed apertures have been formed along the entire length of weatherstrip so air is not entrapped as it is compressed inside the weatherstrip when the closure is closed. More specifically, the apertures insure that the internal air pressure is ambient at all times. Thus, mechanical flexing of the weatherstrip remains the principal design criteria for sealing with this improvement. Advantageously, by eliminating air entrapment, the closing effort for a rapidly closing door is reduced. Still, it should be recognized that this approach is not effective in improving the sealing efficiency since the interference fit is not appreciably increased.

Another idea that has gained some acceptance in the automotive industry recently is to employ at least two weatherstrips in juxtaposition to seal together when the door or lid is closed. The engaging parts of the weatherstrips are designed to form a labyrinth seal, and as a result some improved sealing is obtained. Of course, with this arrangement the degree of interference fit commensurate with easy closing is still sorely limited, and the cost of forming the seal is substantially increased.

Another approach that has been proposed for vehicles is to make the weatherstrips inflatable. The basic idea is that when the door is closed, a positive pressure (greater than ambient pressure) is applied inside the closed tubular weatherstrip to provide expansion against the door and door frame, thus providing increased interference and an improved seal. As will be recognized, this approach does reduce the door closing effort and compression shock because the non-inflated weatherstrip does not engage in an interference fit with the door and the door frame until the door is closed and the superatmospheric pressure is applied.

This concept, while useful in aircraft and aerospace vehicles presents problems when attempts have been made to adapt it to general automotive use. First, in order to provide a closure sealing system using the superatmospheric pressure concept, a sophisticated air pressure supply system that is highly reliable must be provided. This is so since if air pressure is lost, a complete failure of the sealing function results and the interior is susceptible to damage from water leakage, as well as the passengers being exposed to extremes of hot and cold atmospheric conditions and excessive wind noise. Furthermore, such a sophisticated air pressure system is relatively expensive, and thus adding such auxiliary equipment is not conducive to competitive pricing of a consumer product, such as an automobile.

Similarly, the superatmospheric inflatable weatherstrip must not lose pressure over extended periods of time. To guard against this in an automotive system where small, pin-hole leaks are inevitable, especially after several years of use, an electric pump would be required to be periodically energized to maintain the optimum sealing pressure. Such a condition would inevitably lead to the need for increased storage capacity of the electrical battery in the automobile, and under extended periods of inactivity of the automobile, complete discharge of the battery. Additionally, the superatmospheric pressure system must provide relatively sophisticated regulators to compensate for variations in ambient pressure conditions, such as due to altitude and barometric pressure variations, as well as temperature variations. Such additional cost adds to the prohibitiveness of using this type of system on a high volume consumer product, such as an automobile.

SUMMARY OF THE INVENTION

Accordingly, it is a primary object of the present invention to provide a sealing apparatus and method overcoming the above-described limitations and disadvantages of the prior art.

Another object of the present invention is to provide a sealing apparatus and method for transversely movable, such as swinging vehicular closures that both addresses and reconciles the seemingly conflicting problems of reduced closing effort and good interference sealing.

An additional object of the present invention is to provide a method and apparatus for sealing transversely movable vehicular closures that substantially eliminates the unpleasant and annoying problem of compression shock.

Still another object of the present invention is the provision of a sealing apparatus for a transversely movable vehicle closure having a deflatable sealing member that is deflated at closing to provide clearance to allow passage of air around the sealing member to reduce closing effort and prevent compression shock. Upon closing, the sealing member is reinflated by ambient pressure for firm sealing engagement by increased resilient interference between the vehicle closure and body.

Additional objects, advantages, and other novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the foregoing and other objects, and in accordance with the purposes of the present invention as described herein, an apparatus is provided for tightly sealing a vehicular closure such as a swinging door or trunk lid on an automobile. This type of closure is mounted so as to provide relative transverse movement between the closure and the closure frame or vehicle body during closing.

The apparatus includes a resilient sealing member having a deflatable bulbular or tubular section. The sealing member also includes a mounting section to fixedly secure the sealing member either around the inner peripheral margin of the closure or to the vehicle body around the entire periphery of the opening. When the door is closed and the sealing member inflated, a tight interference seal is provided between the door and the body that prevents the passage of air and moisture.

A vacuum source, such as a bellows, vacuum canister or vacuum pump, is connected to the sealing member. When the negative pressure of the vacuum source is applied to the sealing member, the tubular section deflates and collapses. Conversely, when air at ambient pressure is readmitted to the sealing member, the operative tubular section reexpands due to its resilient memory.

Application of negative pressure to the sealing member may be controlled by means of any number of devices. Some examples are electrically actuated pneumatic solenoids and valves, mechanically actuated pneumatic valves, check valves and fluidic devices. These devices are placed in feed lines providing communication between the vacuum source, the deflatable sealing member and the atmosphere.

Preferably, negative pressure is applied so that the sealing member is deflated when the door is closed. With the sealing member deflated and thus collapsed, the degree of interference between the sealing member and the door or door frame is reduced, or even substantially eliminated. The force required to overcome the interference and latch the door is advantageously reduced proportionally. Thus, a desirable, relatively low closing effort is all that is required to operate the door.

In addition, it should be recognized that because the operative tubular section of the sealing member is collapsed (so that a space exists between the sealing member and the closure or closure frame), the passage of air is allowed. Consequently, not only is the closing effort reduced, but the unpleasant problem of compression shock, characteristic of prior art closure sealing systems, is avoided.

After the closure is closed and air is released past the sealing member as described, the control system readmits air at ambient pressure to the operative tubular section. Because of its inherent resiliency, the sealing member assumes the desired interference fit/sealing engagement with the closure or closure frame. Advantageously, when expanded, the sealing member provides the desired increased resilient interference between the sealing member and the closure or closure frame that is not possible with presently utilized closed cell sponge weatherstripping without increasing the closing effort to unacceptable extremes. Of course, it is possible to provide the improved sealing without raising the required closing effort with the present system since the sealing member is collapsed when the closure is initially closed.

In order to absorb and suppress shock when the closure is initially closed, the sealing member may include a non-deflatable bumper portion. Preferably, the bumper portion is integrally formed as a part of the sealing member that substantially retains its original cross section when subjected to negative pressure. Advantageously, the bumper assures proper alignment and latching of the closure and prevents damage to the closure, latch and closure frame when, for example, the door or trunk lid is slammed shut. Since the bumper portion occupies only a relatively small proportion of the entire annular sealing member extending around the door opening, the closing effort is kept well within the acceptable limit. Indeed, in accordance with this option, the bumper portion is preferably sized and positioned to simulate the solid door closing feel and sound preferred and expected by the auto-buying public.

In accordance with yet another aspect of the present invention, a method is provided for sealing a closure with a deflatable sealing member including the steps of providing the deflatable sealing member for resilient interference engagement between the closure and the body; deflating the sealing member; moving said closure to a closed position while providing relative transverse movement between said sealing member and one of said closure and said body; maintaining said sealing member in a deflated condition during the closing movement; and venting said sealing member to ambient pressure after closing. The deflation of said sealing member to a reduced cross section during closing of said closure allows passage of air from inside the vehicle past said sealing member to substantially reduce closing effort and eliminate compression shock. After closing inflation of said sealing member by ambient pressure releases said sealing member for firm sealing engagement with increased resilient interference between said closure and said body. The sealing member thus provides a firm seal of high integrity that substantially prevents the passage of air and moisture around the closure.

The deflatable sealing member may be particularly adapted for sealing a vehicular closure such as a swinging door or trunk lid. When moving a swinging closure to a closed position relative transverse movement is provided between the sealing member and either the closure or the vehicle body or closure frame. By maintaining the sealing member deflated during closing and latching, interference between the sealing member and closure or closure frame is reduced, as desired.

In addition, sudden and unpleasant air compression so often produced by swinging closures of this type is avoided. More specifically, the air escape path between the sealing member and the closure or closure frame allows the passage of air to the exterior of the vehicle, thus substantially eliminating air compression inside the vehicle.

The sealing member may initially be deflated and collapsed either when the closure is opened or closed. Preferably, however, deflation occurs rapidly in direct response to closing. In this manner, the negative pressure in the sealing member need not be maintained throughout the entire time the closure remains open.

Lastly, sealing is provided by simply venting the resilient sealing member to ambient pressure following closing of the closure by inexpensive and reliable mechanical valves. The sealing member expands instantaneously in response to closing and latching of the closure providing a tight interference seal of high integrity. Of course, it should be recognized that since the sealing member seals when held at ambient pressure, full sealing is still provided even if the vacuum system were to fail. Thus, the system of the present invention includes a built-in fail-safe feature that protects a passenger compartment of a vehicle from moisture damage as well as ambient air intrusion even under the most adverse conditions.

Still other objects of the present invention will become readily apparent to those skilled in this art from the following description wherein there is shown and described a preferred embodiment of this invention, simply by way of illustration of one of the modes and alternative embodiments best suited to carry out the invention. As it will be realized, the invention is capable of still other different embodiments and its several details are capable of modifications in various, obvious aspects all without departing from the invention. Accordingly, the drawings and descriptions will be regarded as illustrative in nature and not as restricted.

BRIEF DESCRIPTION OF THE DRAWING

The accompanying drawing incorporated in and forming a part of this specification illustrates several aspects of the present invention and together with the description serves to explain the principles of the invention. In the drawing:

FIGS. 2 and 2A are schematical representations (partially in cross section) showing one embodiment of the apparatus of the present invention when the door is closed; FIGS. 3 and 3A are schematical representations similar to FIGS. 2 and 2A but showing the same embodiment as the door is being closed;

Reference will now be made in detail to the present preferred embodiment of the invention, an example of which is illustrated in the accompanying drawing.

DETAILED DESCRIPTION OF THE INVENTION

Figure 1:
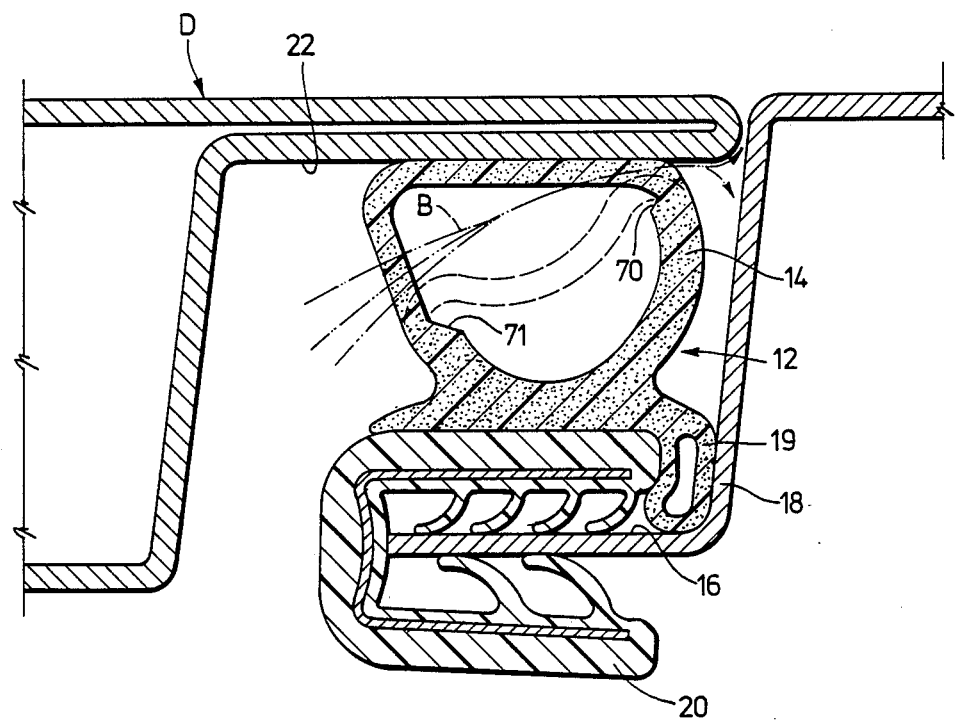
FIG. 1 is a cross-sectional representation showing a sealing member mounted to the vehicle body in sealing engagement with the door.

Reference is now made to the drawing figures showing the system or apparatus 10 of the present invention for tightly sealing a closure, such as a door D on an automobile. As best shown in FIG. 1, the apparatus 10 includes a sealing member or weatherstrip 12 including a bulbular or tubular section 14. This sealing member 12 is mounted to face 16 of the door frame or vehicle body 18 by means of an integral mounting section 19. A one-way clip 20, adhesive or any other appropriate means may be utilized to fix the sealing member 12 in place.

The sealing member 12 is constructed of neoprene or other elastomeric material having sufficient resiliency to provide tight sealing engagement with the door D when in the closed position and the sealing member 12 vented to the atmosphere (see full line representation in FIG. 1). Of course, the sealing member 12 forms a ring extending around the entire door opening to assure complete sealing and thereby prevent the passage of moisture or air between interior door surface 22 and the door frame face 16.

As best shown in FIGS. 2, 2A, 3 and 3A, in one embodiment the sealing member 12 may be connected to a bellows pump 24 by means of an air feed line 26. The bellows pump 24 is mounted in the door hinge area with one end slidably engaging the forward edge of the door and the other end fixed to the vehicle body. Thus, when the door D is opened by swinging action, the bellows 24 is compressed to pressurize air in the system 10 (See FIG. 3). Conversely, when the door D is closed, the resilient bellows 24 is allowed to reexpand generating a vacuum (See FIG. 2).

Various Valves control application of the vacuum or negative pressure produced by the bellows 24 through the feed line 26 to the sealing member 12 during door movement. When the door D is closed and latched as shown in FIG. 2, the "pinch to open" valve 28 is opened and the sealing member 12 is in communication with the atmosphere. More particularly, the pinch to open valve 28 could be a duck-bill valve. The duck-bill is pointed to communicate with the atmosphere so that when the sides of the valve 28 are pinched, ambient air is allowed to pass into the system. Conversely, when the sides are not pinched (FIGS. 3, 3A), the walls of the valve 28 collapse and close so as to block the intake of air through the valve. With the valve 28 open to atmosphere with the door closed, the tubular section 14 of the sealing member 12 is expanded to engage the door and provide tight interference sealing (refer back to full line representation in FIG. 1).

In operation, when the door D is opened, the bellows 24 is compressed and the pressurized air is exhausted through the lines 26 and 30 and vented through the one-way exhaust valve 32 to the atmosphere. An additional one-way valve 34 in the feed line 26 upstream from the exhaust line 30 prevents the pressurized air from tending to pressurize the sealing member 12. In addition, during opening, the pinch to open valve 28 is released and thus closes so as to block communication between the sealing member 12 and the atmosphere.

When the door D is then closed (see action arrow A in FIG. 3), the collapsed bellows 24 is reexpanded. During door closing, the one way valve 32 prevents the inward flow of air from the atmosphere. Thus, air for reexpansion must come from the feed line 26 through the one way valve 34. Since the pinch to open valve 28 remains closed during door closing, air is drawn into the bellows 24 from the tubular section 14 of the sealing member 12. As this occurs, the sealing member 12 deflates and collapses to a reduced cross section. The evacuation occurs through the port 37 in the tubular section 14 connected to the feed line 26; this port being the only opening in the entire annular sealing member 12.

Once the door D completely closes, the pinch to open valve 28 opens again. This venting allows air at ambient pressure to again fill the tubular section 14 of the sealing member 12. As the tubular section 14 fills with air it expands from the dashed line position shown in FIG. 1 into sealing engagement with the door (see full line position of FIG. 1, and also note FIG. 2). At the instant following closing and latching of the door D, it should be appreciated that the reinflation of the sealing member 12 lags slightly behind due to the length of the vent line 36 and feed line 26.

In summary, with the sealing member 12 collapsed, interference between the door D and sealing member 12 is reduced. Thus, the door D closes more easily. Less closing effort is therefore required and this results in smoother overall operation and more reliable latching of the door D in the closed position. In essence, when the sealing member 12 is collapsed, a space exists between the door D and the sealing member (again see dashed line position of sealing member in FIG. 1). Air at increased pressure that would otherwise be trapped in the interior of the automobile by the closing of the swinging door D is allowed to escape through this space prior to the sealing member 12 being reexpanded into sealing engagement (note dashed line action arrow B). Thus, hard closing and compression shock so prevalent in prior art closure sealing systems is substantially eliminated.

Figure 4:
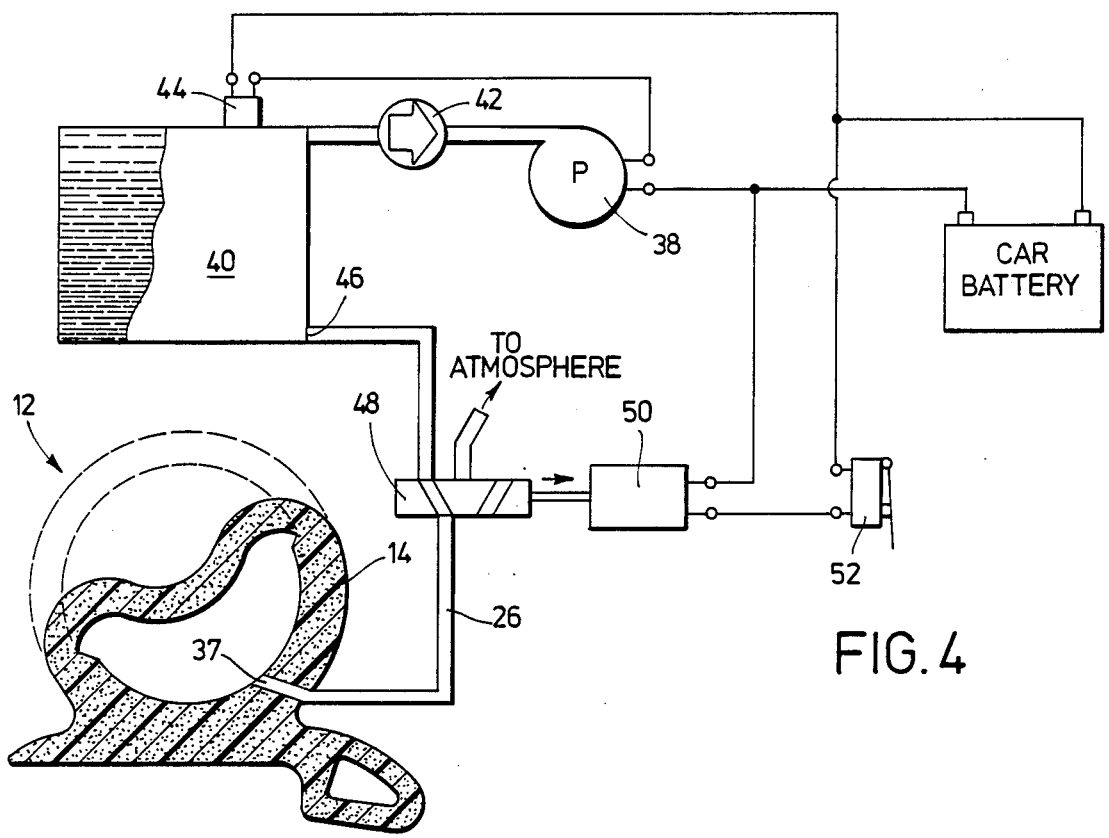
FIG. 4 is a schematical representation of an alternative embodiment of the invention.

An alternative embodiment of the present invention is shown in FIG. 4. In this embodiment, a motor driven vacuum pump 38 is connected to a vacuum storage cannister 40 through a one way valve 42. A pressure sensor switch 44 connected to the cannister 40 activates the pump 38 whenever the air pressure in the cannister 40 exceeds a certain preset level. The pump 38 then evacuates air from the cannister 40 until the pressure setting of the switch 44 is satisfied. The one way valve 42, of course, prevents the bleeding of air from the pump 38 back into the cannister 40 when the pump is off.

The cannister 40 includes a port 46 that communicates with one passage of a two-way electro-pneumatic valve 48 to evacuate the sealing member 12. A second passage of the valve 48 connects the sealing member 12 to atmosphere. The solenoid 50 controlling the valve 48 is connected to a "door open" switch 52 powered by the car battery.

When the door D is closed and the solenoid 50 of the valve 48 is deenergized, the passage leading to the cannister 40 is blocked and the sealing member 12 is connected to atmosphere. Thus, when the door is closed, the sealing member 12 is vented to ambient pressure through the feed line 26 and therefore expanded to provide full interference sealing engagement (note dashed line contour of tubular section 14, FIG. 4). Conversely, when the door is opened, the valve 48 is energized and the cannister 40 and sealing member 12 are placed into communication (as shown in FIG. 4). The tubular section 14 of the sealing member 12 is therefore evacuated and deflates to a reduced cross section. The sealing member 12 remains collapsed until after the door is again closed. In this way, this additional embodiment provides substantially the same advantages with respect to the ease of closing effort, prevention of compression shock and full sealing substantially as described above with the first embodiment.

If desired, an additional delay to expansion of the tubular member 14 (other than afforded by the length of the line 26), may be employed in the electrical circuit by incorporating a timer or other delay component (not shown). This provides the convenience of allowing the door or the like to be closed, quickly reopened and closed again, or all sealing members 12 to be activated at once, as may be preferred by some car owners.

Advantageously, as should be recognized with this second embodiment, the sealing member 12 provides the same increased interference with the door for improved sealing when the door is closed. Further, this sealing is achieved with this different control system (FIG. 4) with the same reduced effort required to close the door D in the first embodiment since the sealing member 12 is deflated to a reduced cross section at closing. Thus, the generic system of the present invention clearly allows the seemingly conflicting concerns of low closing effort and good sealing to be addressed and solved.

Figure 5:
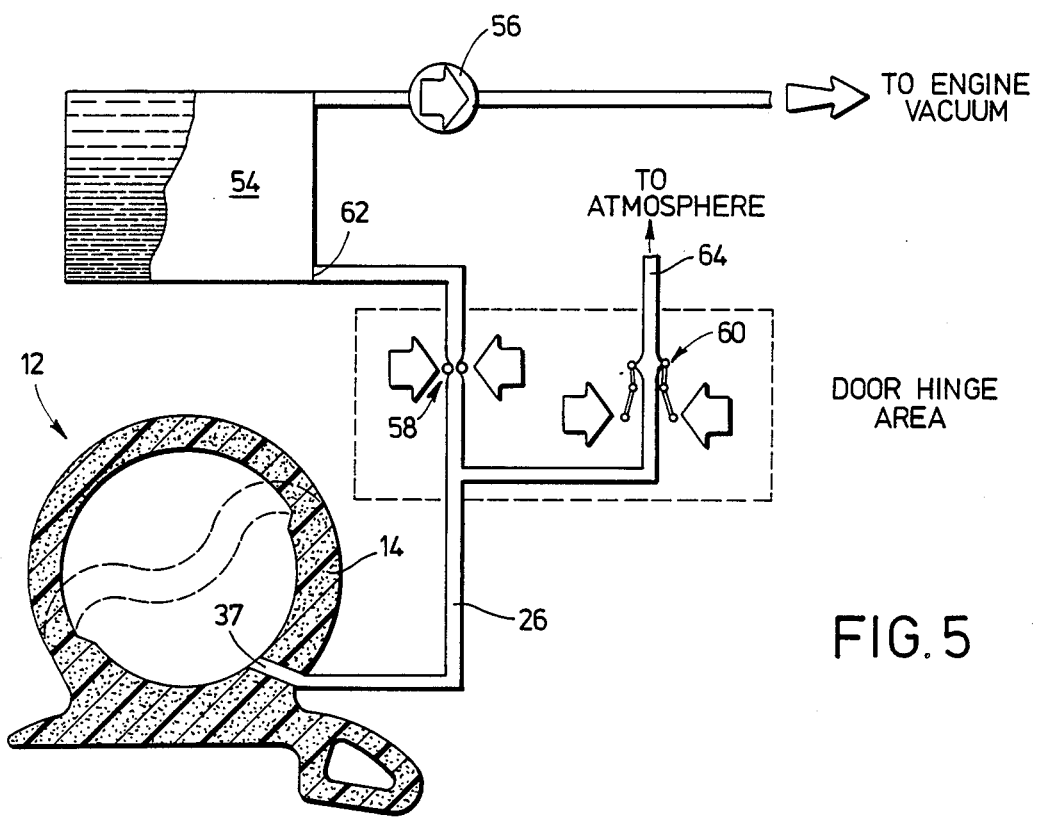
FIG. 5 is a schematical representation of yet another alternative embodiment of the present invention.

Yet another embodiment of the invention is shown in FIG. 5. In this embodiment, a vacuum cannister 54 is connected through a one way valve 56 to engine vacuum. When the engine is shut off, the one way valve prevents loss of vacuum through the intake manifold. As shown, the cannister 54 is connected through the port 62 to a "pinch to close" valve 58 that is positioned in the door hinge area (i.e. substantially as described above with respect to the pinch to open valve 28). When this valve 58 is pinched between the door D and the body of the vehicle, it is fully closed so as to seal off any air flow. The pinch to close valve 58 is connected on the other end to the port 37 of the sealing member 12, as well as to a pinch to open valve 60 also mounted in the door hinge area, substantially as shown in FIGS. 2A and 3A.

When the door D is swung opened, the pinch to close valve 58 opens and the pinch to open valve 60 closes. Thus, the sealing member 12 is evacuated through the port 62 and line 26 leading to the cannister 54. Again, as previously described, this causes the sealing member 12 to deflate and collapse to a reduced cross section, as shown in dashed line contour in FIG. 5. The sealing member 12 remains in the deflated position until the door D is again closed and the valve 58 is reclosed and the valve 60 reopened. Thus, at the instant the door closes interference between the sealing member 12 and door D is minimized. Consequently, the required closure effort is reduced and air is allowed to escape from the automobile interior past the seal.

Once closed, the pinch to close valve 58 is closed blocking the port 62 to the vacuum cannister 54. Additionally, the pinch to open valve 60 is opened. Thus, the sealing member 12 is vented to atmosphere through the feed line 26 and vent line 64. Consequently, the sealing member 12 reexpands into tight resilient engagement so as to firmly seal against the door D.

Figure 6:
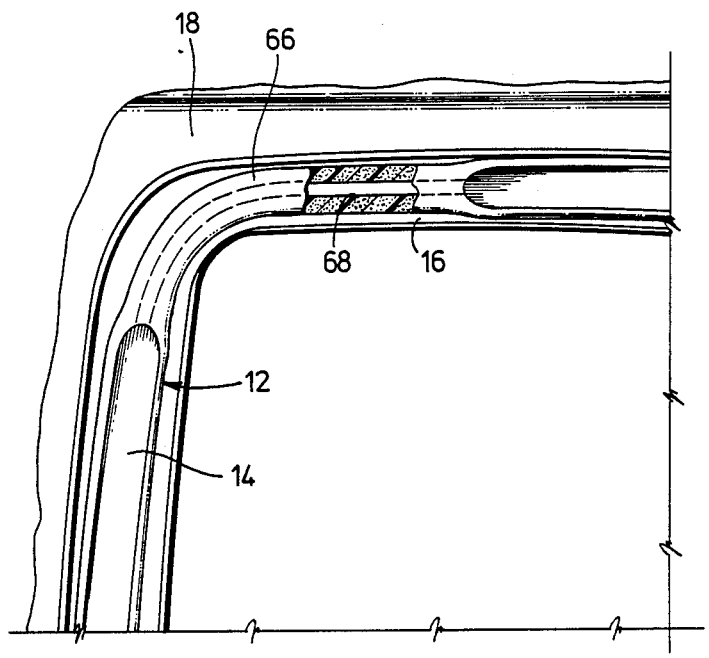
FIG. 6 is a front view of the deflated sealing member at a corner of the door frame with an integral bumper for absorbing shock when the door closes.

A bumper portion 66 may be provided with each of the embodiments described above to absorb shock produced when the door D closes. As shown in FIG. 6, the bumper portion is integrally formed with the sealing member 12. More specifically, for example, spaced portions of the sealing member 12 (such as at the corners of the door D) may be formed with closed cell foam having substantially full thickness throughout except for internal transfer passageway 68 so as to resist full deflation when a vacuum is applied. Thus, the bumper portion 66 provides a limited resilient surface for contacting the door D during closing that maintains the proper spacing between the door and the frame 18 during closing. In this way, proper latching of the door D is assured and damage to the door, door frame and latch are avoided. In addition, the bumper portion 66 serves to positively maintain the space between the door and the collapsed tubular portions 14 of the sealing member 12 for the passage of air and the prevention of compression shock.

Of course, the foam density in the bumper portion 66 and around the passageway 68 is designed to simulate the sealing properties as in the remainder of the inflated sealing member 12, as well as to prevent collapse of the passageway. Furthermore, the foam structure over this limited length is not sufficient to make the door difficult to close, and indeed may be formulated to simulate the solid sound and feel of door closing that consumers have come to expect. Thus, this added feature is particularly useful in allowing the apparatus and method of the present invention to gain acceptance in the market.

The method of sealing a vehicle closure utilizing the concepts of the present invention includes the steps of (1) providing a deflatable sealing member 12 for resilient interference engagement between the closure and the body that when inflated by ambient pressure has sufficient resiliency to provide a firm seal by interference engagement; (2) deflating the sealing member 12 until it collapses to a reduced cross section; (3) moving said closure to a closed position while providing relative transverse movement between said sealing member and one of said closure and said body; (4) maintaining said sealing member in a deflated condition during the closing movement; and (5) venting said sealing member to ambient pressure after closing.

In the practice of the method, the sealing member 12 is deflated in direct response to relative movement of the door D which produces relative transverse movement between the sealing member and the vehicle body 18. In the embodiments shown in FIGS. 4 and 5, deflating occurs during door opening. Alternatively, in the main embodiment shown in FIGS. 2, 2A, 3, 3A, the deflating occurs only during door closing. Advantageously, with the latter approach, the deflating of the sealing member 12 need not be maintained throughout the entire time the door D remains open.

As best shown in FIG. 1, with the resilient member 12 deflated to a reduced cross section in accordance with the method, a space is provided between the sealing member and the door D. This space allows the passage of relatively high pressure air that would otherwise be trapped in the passenger compartment of the automobile. Thus, annoying and unpleasant compression shock is prevented. In addition, door closing effort is reduced because of this and since interference between the door D and the deflated sealing member 12 is reduced.

In direct response to the closing and latching of the door is the venting of the resilient sealing member 12 to ambient pressure. Upon return to ambient pressure, the tubular portion 14 of the sealing member reexpands so as to provide a tight, high-interference seal between the door and the door frame.

In order to provide controlled collapse of the tubular portion 14, as shown in the various figures of the drawings, elongated notches 70, 71 (see FIG. 1) are formed along the interior surface. This provides an exact location for the bending of the sides to take place, and assures that the flow path (see arrow B) for the pressurized air is established. The outer elongated segment of the tubular portion 14 that actually seals against the interior or opposite surface 22 is preferably reduced in cross section to provide additional flexibility and further enhance the sealing capability.

In summary, numerous benefits have been described which result from employing the concepts of the present invention. The sealing member 12 is designed to provide greater interference for added sealing between the door and the vehicle body. Advantageously, this may be done without increasing the door closing effort and while eliminating compression shock since the sealing member 12 is deflated and collapsed to a reduced cross section at closing. Spaced bumper portions 66 along the length of the sealing member 12 may be provided to absorb shock as the door closes and provide the desired sound and feel. In addition, the bumper portions assure that a space is maintained at closing between the door D and the deflated sections of the sealing member 12 so as to allow the passage of the high pressure air from the passenger compartment.

The foregoing description of a preferred embodiment of the invention has been presented for purposes of illustration and description. It is not intended to be exhaustive or limit the invention to the precise form disclosed. Obvious modifications or variations are possible in light of the above teachings. For example, an open cell foam sealing member may be utilized instead of the elastomeric tubular sealing member 12 described above. Also, the tubular or bulbular portion 14 may be bifurcated with different pressures applied to the two chambers; a latex foam bulb integrally formed on top of the tubular portion 14; and/or the tubular portion 14 offset to provide cantilever bending action; all to provide modified activating movement and consequently the desired sealing action preferred for a particular application. The three system embodiments were chosen and described to provide the best illustrations of the principles of the invention and its practical application to thereby enable one of ordinary skill in the art to utilize the invention in various other embodiments and with various modifications as are suited to the particular use contemplated. All such modifications and variations are within the scope of the invention as determined by the appended claims when interpreted in accordance with the breadth to which they are fairly, legally and equitably entitled.

We claim:

1. An apparatus for sealing between a hinged vehicle closure and body, such as between a door and door frame forming an opening of an automobile, comprising:

a deflatable sealing member for resilient interference engagement between said closure and said body; said sealing member including a non-deflatable bumper portion defining a limited resilient surface for contacting a portion of said body to both absorb shock during closing and positively maintain a predetermined space between the closure and the remainder of the sealing member when deflated for the passage of air and prevention of compression shock;

vacuum source means connected to said deflatable sealing member;

control means for connecting said vacuum source means to said deflatable sealing member at least during the closing of said closure, and for venting to ambient pressure after closing; said sealing member having sufficient resiliency to provide a firm seal by interference engagement upon inflation by ambient pressure;

whereby deflation of said sealing member to a reduced cross section during closing of said closure allows passage of air from inside the vehicle past said sealing member by the positive influence of said bumper portion to substantially reduce closing effort and eliminate compression shock, and after closing inflation of said sealing member by ambient pressure releases said sealing member for firm sealing engagement with increased resilient interference between said closure and said body.

* * * * *